United States Patent
Todorov et al.

(10) Patent No.: US 9,666,896 B2
(45) Date of Patent: May 30, 2017

(54) POSITIVE ELECTRODE FOR NONAQUEOUS SECONDARY BATTERY

(75) Inventors: Yanko Marinov Todorov, Saitama (JP); Yasunori Tabira, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 352 days.

(21) Appl. No.: 13/509,019

(22) PCT Filed: Nov. 25, 2010

(86) PCT No.: PCT/JP2010/070995
§ 371 (c)(1),
(2), (4) Date: May 10, 2012

(87) PCT Pub. No.: WO2011/065408
PCT Pub. Date: Jun. 3, 2011

(65) Prior Publication Data
US 2012/0270106 A1 Oct. 25, 2012

(30) Foreign Application Priority Data

Nov. 25, 2009 (JP) .................................. 2009-267306

(51) Int. Cl.
*H01M 4/48* (2010.01)
*H01M 10/052* (2010.01)
(Continued)

(52) U.S. Cl.
CPC .......... *H01M 10/052* (2013.01); *C01G 53/42* (2013.01); *C01G 53/50* (2013.01); *H01M 4/485* (2013.01);
(Continued)

(58) Field of Classification Search
CPC ............................. H01M 4/485; H01M 4/525
(Continued)

(56) References Cited

FOREIGN PATENT DOCUMENTS

JP 2007-265731 10/2007
JP 2008-84665 4/2008
(Continued)

OTHER PUBLICATIONS

International Search Report PCT/JP2010/070995, dated Jan. 25, 2011.

*Primary Examiner* — Ula C Ruddock
*Assistant Examiner* — Frank Chernow
(74) *Attorney, Agent, or Firm* — Young & Thompson

(57) ABSTRACT

To provide a positive electrode for nonaqueous secondary batteries having improved charge/discharge cycle characteristics, the positive electrode contains in its active material layer a compound represented by formula:

$$Li_zNi_{1-x-y}Ti_x(M_pLi_q)_yO_2$$

wherein x is a positive number less than 0.3; y is a positive number less than 0.25; z is a number from 0.95 to 1.05; M is a polyvalent metal satisfying the relation: $pr_M + qr_L = 54$ to 69 pm (where $r_M$ is the ionic radius of M, and $r_L$ is the ionic radius of $Li^+$); p is a positive number; q is 0 or greater; p and q satisfy the relations: $p+q=1$ and $pv+q=3$; and v is the valence of the metal M. When analyzed by XRD, the compound shows diffraction peaks assigned to the planes (003) and (104). The ratio of the area of the peak of the (003) plane to that of the (104) plane is 0.5 to 0.75.

2 Claims, 3 Drawing Sheets

(51) Int. Cl.
*C01G 53/00* (2006.01)
*H01M 4/485* (2010.01)
*H01M 4/525* (2010.01)

(52) U.S. Cl.
CPC ......... *H01M 4/525* (2013.01); *C01P 2002/52* (2013.01); *C01P 2002/54* (2013.01); *C01P 2002/72* (2013.01); *C01P 2002/74* (2013.01); *C01P 2006/40* (2013.01); *Y02E 60/122* (2013.01)

(58) Field of Classification Search
USPC ........................................................ 429/223
See application file for complete search history.

(56) References Cited

FOREIGN PATENT DOCUMENTS

| | | | |
|---|---|---|---|
| JP | 2008-198463 | 8/2008 | |
| JP | 2008-300244 | 12/2008 | |
| JP | 2009-224097 | * 10/2009 | ............ H01M 10/36 |
| JP | 2009-224098 | 10/2009 | |

\* cited by examiner

POSITIVE ELECTRODE FOR NONAQUEOUS SECONDARY BATTERY

TECHNICAL FIELD

This invention relates to a positive electrode for use in nonaqueous secondary batteries, such as lithium secondary batteries. The invention also relates to a nonaqueous secondary battery having the positive electrode.

BACKGROUND ART

The assignee common to this application previously proposed a positive electrode for nonaqueous secondary batteries having an active material layer containing, in addition to an active material, a compound represented by $LiNi_{1-x}Ti_xO_2$ (0<x<0.7) (see patent literature 1 below). A nonaqueous secondary battery having the proposed positive electrode is able to supply a large quantity of lithium to the negative electrode active material in the first charge so that the irreversible capacity is reduced, which leads to improve charge/discharge cycle characteristics.

CITATION LIST

Patent Literature

Patent literature 1: JP 2008-300244A

SUMMARY OF INVENTION

Technical Problem

An object of the invention is to improve the above described positive electrode the assignee proposed, specifically to provide a positive electrode having improved performance, especially improved energy density over the above described positive electrode.

Solution to Problem

The invention provides a positive electrode for nonaqueous secondary batteries having an active material layer containing an active material. The active material layer further contains a compound represented by formula:

$$Li_zNi_{1-x-y}Ti_x(M_pLi_q)O_2 \quad (1)$$

wherein x represents a positive number less than 0.3; y represents a positive number less than 0.25; z represents a number from 0.95 to 1.05; M represents a polyvalent metal satisfying the relation: $pr_M+qr_L=54$ to 69 pm (where $r_M$ represents the ionic radius of M, and $r_L$ represents the ionic radius of $Li^+$); p represents a positive number; q represents a number equal to or greater than 0; p and q satisfy the relations: p+q=1 and pv+q=3; and v represents the valence of the metal M.

When analyzed by XRD, the compound shows diffraction peaks assigned to the planes (003) and (104). The ratio of the area of the peak of the (003) plane to that of the (104) plane is 0.5 to 0.75.

Advantageous Effects of Invention

The positive electrode of the invention is able to supply a large quantity of lithium to the negative electrode active material at the first charge so that the irreversible capacity is reduced more than conventionally achievable, which leads to further improve charge/discharge cycle characteristics of a nonaqueous secondary battery using the positive electrode. With the cycle characteristics being equal to those conventionally obtained (by the technique of patent literature 1), the amount of the compound of formula (1) may be reduced compared with the conventional technique. This allows for an increase in the total energy density of the secondary battery.

DESCRIPTION OF EMBODIMENTS

Figure 1:
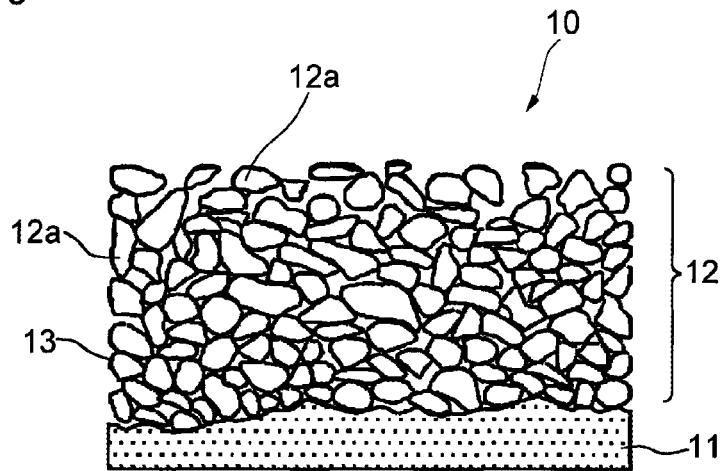
FIG. 1 is a schematic view illustrating a cross-sectional structure of a negative electrode suitably used in a secondary battery having the positive electrode of the invention.

The invention will be described based on its preferred embodiments. The positive electrode of the invention has a positive electrode active material layer formed on, for example, at least one side of a current collector. The positive electrode active material layer contains an active material. Any active materials known in the art may be used in the invention, such as lithium-transition metal complex oxides, including $LiCoO_2$, $LiNiO_2$, $LiMnO_2$, $LiMn_2O_4$, $LiCo_{1/3}Ni_{1/3}Mn_{1/3}O_2$, $LiCo_{0.5}Ni_{0.5}O_2$, $LiNi_{0.7}Co_{0.2}Mn_{0.1}O_2$, $Li(Li_xMn_{2x}Co_{1-3x})O_2$ (where 0<x<1/3), and $LiMn_{1-z}Z_zPO_4$ (where 0<z≤0.1, and Z is at least one metal element selected from the group consisting of Co, Ni, Fe, Mg, Zn, and Cu). $LiFePO_4$ having an olivine structure is also useful as a positive electrode active material. It is preferred to use a positive electrode active material having a high capacity, such as $LiCo_{1/3}Ni_{1/3}Mn_{1/3}O_2$, $Li(Li_xMn_{2x}Co_{1-3x})O_2$ (where 0<x<1/3) and $LiNiO_2$.

The active material layer contains a compound represented by formula (1) shown below in addition to the positive electrode active material. This compound is included in "lithium-transition metal complex oxides" referred to above in the broad sense of the term and is theoretically employable as a positive electrode active material of a nonaqueous secondary battery. Nonetheless, the compound is incapable of providing a secondary battery with a sufficient capacity when it is used alone. In the present invention, therefore, the compound is treated as a substance separated from a positive electrode active material. The present inventors' extensive study has revealed that the compound of formula (1) is able to release a large amount of lithium as irreversible capacity in the first charge. Incorporating the compound into a positive electrode active material layer together with the active material achieving high capacity as an additive for the active material will allow for feeding a sufficient amount of lithium to the negative electrode in the first charge. As a result, lithium spreads throughout the negative electrode to bring about improved negative electrode characteristics. This allows the positive electrode active material to exhibit its characteristics to the full, leading to the improvement of the positive electrode performance.

  (1)

wherein x represents a positive number less than 0.3; y represents a positive number less than 0.25; z represents a number from 0.95 to 1.05; M represents a polyvalent metal satisfying the relation: $pr_M+qr_L=54$ to 69 pm (where $r_M$ represents the ionic radius of M, and $r_L$ represents the ionic radius of $Li^+$); p represents a positive number; q represents a number equal to or greater than 0; p and q satisfy the relations: $p+q=1$ and $pv+q=3$; and v represents the valence of the metal M.

A lithium-transition metal complex oxide used as a positive electrode active material of nonaqueous secondary batteries, typified by $LiCoO_2$, has a layered crystal structure. Although the lithium-transition metal complex oxide having the $LiCoO_2$ type layered crystal structure easily absorbs and releases lithium ions between the layers so that lithium ions are ready to move in the crystal, it has low ability to afford lithium ions to the negative electrode active material as irreversible capacity. On the other hand, a lithium-transition metal complex oxide having a rock salt structure, such as $LiFeO_2$ or $LiMnO_2$, is incapable of causing lithium ions to diffuse therein because of having no interlayer channels permitting lithium ion absorption and release. The oxide of this type, however, has high ability to afford lithium ions to the negative electrode active material as irreversible capacity. A positive electrode active material used in combination with a negative electrode active material having high capacity is required to have both the property of easily absorbing and releasing lithium ions and the property of giving lithium ions as irreversible capacity to the negative electrode active material. None of the lithium-transition metal complex oxides known as a positive electrode active material satisfies both of these properties. Under these circumstances, the present invention succeeded in enhancing the ability of a positive electrode to give lithium ions as irreversible capacity to a negative electrode by using the compound of formula (1) as an adjutant for a lithium-transition metal complex oxide as a positive electrode active material.

The compound of formula (1) shows an intermediate crystal structure between the layered crystal structure of an $LiCoO_2$ type lithium-transition metal complex oxide (α-$NaFeO_2$ type crystal structure; space group: R-3m) and a rock salt type crystal structure (space group: Fm3m). Whether the crystal structure of the compound of formula (1) is closer to the $LiCoO_2$ type layered structure or the rock salt type structure depends primarily on the amount of Ti in formula (1). Ti substitutes for part of Ni and functions to control the main crystal structure of the compound of formula (1). In detail, as the amount of Ti increases, the crystal structure approaches to the rock salt structure. Conversely, as the amount of Ti decreases, the structure approaches to the layered structure. As the crystal structure of the compound of formula (1) approaches the rock salt structure, the ability to provide lithium ions as irreversible capacity increases, but the lithium ion releasability decreases. Hence, part of Li is substituted by a metal M thereby to accelerate the release of lithium ions. Patent literature 1 cited supra discusses about the study on the enhancement of the layered crystal structure but it is silent on the acceleration of lithium ion release.

XRD analysis of the layered crystal structure of the $LiCoO_2$ type lithium-transition metal complex oxide reveals characteristic diffraction peaks assigned to the planes (003) and (104). XRD pattern of the rock salt type lithium-transition metal complex oxide, on the other hand, shows a diffraction peak assigned to the plane (104) with no or weakened peak assigned to the plane (003). Accordingly, whether the crystal structure of a compound of formula (1) is closer to the layered structure or the rock salt structure is quantitatively judged by the ratio of the diffraction peak assigned to the plane (003) to that assigned to the plane (104). The compound of formula (1) for use in the invention has a controlled crystal structure such that, when analyzed by XRD, the area ratio of the peak corresponding to the (003) plane of the layered crystal structure of the $LiCoO_2$ type lithium-transition metal complex oxide to the peak corresponding to the (104) plane may range from 0.5 to 0.75, preferably 0.55 to 0.70, more preferably 0.59 to 0.67.

By the substitution of part of Li with the metal M, the compound of formula (1) shows accelerated release of lithium ions. To achieve this, the metal represented by M is selected so that $pr_M+qr_L$ may be in the range of from 54 to 69 pm, preferably 59 to 62 pm, wherein $r_M$ is the ionic radius of M, and $r_L$, is the ionic radius of $Li^+$. If the ionic radius of the metal M does not satisfy the above relation, it is difficult to obtain a compound of formula (1) having a desired crystal structure. If a compound of formula (1) is obtained at all, the compound would be so stable as to result in reduced function to release Li. As used herein the term "ionic radius of M" refers to the ionic radius of the metal M in the compound of formula (1) with the valence v. The ionic radius values are described, e.g., in Y. Q. Jia, J. Solid State Chem., 95 (1991), 184.

The metal M exists in the compound of formula (1) preferably with a valence of 3, 4 or 6. The term ($M_pLi_q$) in formula (1) is introduced so that the compound represented by formula (1) may have a composition represented by $Li_zO_2$, where Z is a trivalent element, that is, $Z=M_pLi_q$. This is what is meant by the above described relationship $pv+q=3$. Examples of the metal M that satisfies the above recited requirement for ionic radius and exists in the compound of formula (1) with 3, 4, or 6 valence state include trivalent metals, such as Co(III), Fe(III), and Al(III); tetravalent metals, such as Mn(IV); and hexavalent metals, such as Mo(VI). Preferred of them are Co(III) and Mn(IV) for giving a higher irreversible capacity.

As previously stated, Ti in the compound of formula (1) functions to control the crystal structure of the compound. In order for the compound of formula (1) to have a desired crystal structure thereby to exhibit desired performance properties, the subscript x of Ti in formula (1) must be a positive number smaller than 0.3 and is preferably 0.15 to 0.29, more preferably 0.20 to 0.27.

The subscript y of the metal M in formula (1) must be a positive number equal to or less than 0.25 and is preferably 0.05 to 0.20, more preferably 0.08 to 0.15. By so adjusting the metal M content, it is possible to obtain a desired irreversible capacity to be given to the negative electrode active material.

As stated, the subscript z of Li is 0.95 to 1.05, preferably 0.99 to 1.02. If z is less than 0.95, a compound of formula (1) having a desired crystal structure is not obtained. Even if z exceeds 1.05, no further improvement in characteristics is observed.

The compound of formula (1) is obtained by mixing a lithium source, a nickel source, a titanium source, and a metal M source to give a desired stoichiometric ratio and firing the mixture in the air. These sources may be oxides; oxo acid salts, such as carbonates, nitrate, sulfates, and carboxylates; halides; hydroxides; and oxyhydroxides. Examples of the lithium source are $LiCO_3$ and LiOH. Examples of the nickel source include $Ni(OH)_2$. The titanium source is exemplified by $TiO_2$. Examples of the source of Mn as the metal M include $Mn_3O_4$ and $MnO_2$. Examples of the source of Co as the metal M include CoOOH and $CO_3O_4$.

The source materials are mixed, either dry or wet in water or an organic solvent (e.g., acetone), and the mixture is fired in the air. In the case of wet mixing, the mixture may be dried at room temperature or by spray drying, followed by granulation. The firing is preferably carried out at 750° to 900° C., more preferably 800° to 850° C., for 10 to 30 hours, more preferably 15 to 25 hours. It is a generally observable tendency that, at excessively high firing temperatures, the resulting compound of formula (1) lacks oxygen, resulting in difficulty of obtaining a desired crystal structure and, that at excessively low temperatures, impurities, such as an unreacted reactant or an intermediate product, can remain. When the amount of Ti is small, for example, when x for Ti is 0.15 or less, it is not easy to yield a compound having a desired peak area ratio unless the firing temperature is set relatively high as will be demonstrated in Comparative Examples 2 and 5. Therefore, in obtaining a compound in which x is 0.15 or less, it is advantageous to carry out the firing at a temperature ranging from 850° to 900° C. The rate of temperature rise during the firing is preferably 0.1° C./min to 2.0° C./min, more preferably 0.3° C./min to 0.8° C./min. The rate of temperature drop may be in the same range as the rate of temperature rise recited. Appropriately adjusting the rate of temperature drop, in particular, facilitates obtaining the compound of formula (1) with a desired crystal structure. When the rate of temperature drop is excessively high, it would be difficult to realize a desired crystal structure. By properly selecting the composition ratio of the source materials or the firing conditions, a compound having a desired peak area ratio will be obtained. Such a composition ratio and firing conditions can be determined by those skilled in the art using routine trial and error.

The firing may be conducted by a one-stage firing process in which the mixture is heated up to a prescribed firing temperature within the range recited at a prescribed rate of temperature rise or a multi-stage firing process in which the mixture is heated at a temperature lower than the prescribed firing temperature for a prescribed period of time and then heated up to the prescribed temperature. In the case of wet mixing, the multi-stage firing process is advantageous because a liquid component is removed prior to the final firing.

After the firing, the resulting compound of formula (1) is ground to powder of desired size range to be supplied in the form of powdered solid. The above described various positive electrode active materials are generally used in the form of powdered solid. Although the particle size of these powders is not critical in the invention, it is preferred for both the particles of the positive electrode active material and the particles of the compound of formula (1) to have a $D_{50}$ of 5 to 30 μm so that they may be packed at high density to fill the interstices between particles each other. The ratio of the $D_{50}$ of the particles having a larger $D_{50}$ to that of the particles having a smaller $D_{50}$ is preferably 1.5 to 5.

The compound of formula (1) is supplementarily used in combination with a positive electrode active material to feed lithium to the negative electrode active material. From this viewpoint, the ratio of the compound of formula (1) to the positive electrode active material is preferably 5% to 50%, more preferably 5% to 45%, even more preferably 5% to 20%, by weight. With the ratio of the compound of formula (1) being 5 wt % or more, the charge/discharge cycle characteristics would improve. Although it would be better in terms of the cycle characteristics to increase the ratio of the compound of formula (1) to the positive electrode active material, the initial capacity density tends to decrease with an increase of that ratio. It is therefore preferred to limit the ratio to 50 wt % or less in order to balance the improvement on cycle characteristics against reduction in initial capacity density.

The positive electrode of the invention is obtained by, for example, suspending a positive electrode active material and the compound of formula (1) in an appropriate solvent together with an electroconductive material, such as acetylene black, and a binder, such as polyvinylidene fluoride to prepare a positive electrode mixture, applying the mixture on at least one side of a current collector, such as aluminum foil, drying the mixture, followed by rolling and pressing.

It is preferred that a nonaqueous secondary battery having the positive electrode of the invention have an increased amount of lithium ions given off by the compound of formula (1) to the negative electrode active material and accumulated in the negative electrode as irreversible capacity. For this purpose, the feed of lithium ions from the positive electrode to the negative electrode, namely, charging of the battery is preferably performed at a cut-off potential of 4.2 to 4.5 V versus $Li/Li^+$. According to patent literature 1 cited supra, the cut-off potential in the preliminary charge is 4.6 V, which is higher than usually employed as a cut-off potential in the preliminary charge, so as to provide a negative electrode active material with a large irreversible capacity. In the invention, on the other hand, using the compound of formula (1) makes it possible to give the same level of irreversible capacity as achieved by the technique of patent literature 1 to the negative electrode active material in the preliminary charge even at a cut-off potential of 4.2 V, which is a value usually used in charging a nonaqueous secondary battery, without adopting the above recited high-potential preliminary charging. To use a cut-off potential of 4.2 V in the charge is advantageous in that inconveniences caused by a high-potential charge, such as decomposition of the electrolyte, are avoided. It should be noted, however, that the advantage does not inhibit using a high cut-off potential exceeding 4.5 V up to about 5 V in the preliminary charge in the invention. When $LiFePO_4$ having an olivine structure is used as a positive electrode active material, preliminary charging is preferably conducted at a cut-off potential of 4.3 V or higher vs. $Li/Li^+$. As used herein, the term "preliminary charge or charging" denotes the first charging operation conducted after battery assembly, which is generally given by a battery manufacturer before shipment from the factory to market.

The positive electrode of the invention is assembled with a negative electrode, a separator, a nonaqueous electrolyte, and so on into a nonaqueous secondary battery. The negative electrode is composed of, for example, a current collector and a negative electrode active material layer on at least one side of the current collector. The negative electrode active material layer contains an active material. The negative electrode active material is a material capable of absorbing and releasing lithium. While any negative electrode active material known in the art may be employable, it is preferred to use a material providing a large irreversible capacity in the first charge and also having a high theoretical capacity. Such a material is exemplified by Si- or Sn-containing materials.

An Si-containing negative electrode active material is capable of absorbing and releasing lithium ions. Examples of the Si-containing active material include elemental silicon, alloys of silicon with a metal element(s), and silicon oxides. These materials may be used either individually or as a mixture thereof. The metal alloying with silicon is one or more elements selected from, for example, Cu, Ni, Co, Cr, Fe, Ti, Pt, W, B, Mo, and Au. Preferred of these elements are Cu, Ni, and Co. Cu and Ni are more preferred in terms of their high electron conductivity and low capability of forming a lithium compound. The Si-containing active material may have lithium absorbed either before or after assembling the negative electrode into a battery. A particularly preferred Si-containing active material is elemental silicon or silicon oxide for its high lithium absorption capacity.

Examples of the Sn-containing active material include elemental tin and alloys of tin with a metal element(s). These materials may be used either individually or as a mixture thereof. The metal alloying with tin is one or more elements selected from, for example, Cu, Ni, Co, Cr, Fe, Ti, Pt, W, Mo, and Au. Preferred of these elements are Cu, Ni, and Co. Particularly preferred are Cu and Ni.

The negative electrode active material layer may be, for example, a continuous thin layer of the active material, a particulate layer containing the active material in the form of particles, or a sintered layer containing the active material in the form of particles. The negative electrode active material layer may also be a layer having the structure illustrated in FIG. 1. When the negative electrode active material has the form of particles, the negative electrode active material layer may contain a mixture of the particulate active material and metallic particles.

FIG. 1 is a schematic cross-sectional view of a preferred embodiment of the negative electrode that can be used in the invention. The negative electrode 10 of the present embodiment has a current collector 11 and an active material layer 12 on at least one side of the current collector 11. Although FIG. 1 shows only one active material layer 12 for the sake of convenience, the active material layer may be provided on both sides of the current collector 11.

The active material layer 12 contains particles 12a of an Si-containing active material which are coated at least partly with a metallic material 13 having low capability of forming a lithium compound. The metallic material 13 is different from the material making up the particles 12a. There are voids between the metallic material-coated particles 12a. That is, the metallic material covers the surface of the particles 12a while leaving interstices through which a nonaqueous electrolyte containing lithium ions may reach the particles 12a. In FIG. 1, the metallic material 13 is depicted as a thick solid line defining the perimeter of the individual particles 12a for the sake of clarify of the drawing. FIG. 1 schematically illustrates a two-dimensional view of the active material layer 12. Actually, the individual particles are in contact with one another either directly or via the metallic material 13. As used herein, the expression "low capability of forming a lithium compound" means no capability of forming an intermetallic compound or a solid solution with lithium or, if any at all, the capability is so limited that the resulting lithium compound contains only a trace amount of lithium or is very labile.

The metallic material 13 has electroconductivity and is exemplified by copper, nickel, iron, cobalt, and their alloys. A highly ductile metallic material is preferred, which forms a coat break-proof against expansion and contraction of the active material particle 12a. A preferred example of such a material is copper.

It is preferred that the metallic material 13 on the surface of the active material particles 12a be present throughout the thickness of the active material layer 12 in a manner that the particles 12a exist in the matrix of the metallic material 13. By such a structure, the particles 12a hardly fall off even when they pulverize due to expansion and contraction accompanying charge/discharge cycles. Furthermore, electron conductivity across the active material layer 12 is secured by the metallic material 13 so that occurrence of an electrically isolated particle 12a, especially in the depth of the active material layer 12, is prevented effectively. Whether the metallic material 13 is present on the surface of the active material particles 12a throughout the thickness of the active material layer 12 can be confirmed by mapping the metallic material 13 using an electron microscope.

The metallic material 13 covers the surface of the individual particles 12a continuously or discontinuously. Where the metallic material 13 covers the surface of the individual particles 12 continuously, it is preferred that the coat of the metallic material 13 has micropores for the passage of a nonaqueous electrolyte. Where the metallic material 13 covers the surface of the individual particles 12a discontinuously, a nonaqueous electrolyte is supplied to the particles 12a through the non-coated part of the surface of the particles 12a.

The negative electrode 10 having the above described structure can be made by, for example, the method taught in US 2009/0202915A1 filed by the co-assignee of the present invention, which is incorporated herein by reference in its entirety.

The separator to be used with the positive and the negative electrode is preferably chosen from nonwoven fabric of synthetic resins, porous film of polyolefins, such as polyethylene and polypropylene, or polytetrafluoroethylene, and the like.

The nonaqueous electrolyte is a solution of a lithium salt, a supporting electrolyte, in an organic solvent. Examples of the lithium salt include $CF_3SO_3Li$, $(CF_3SO_2)NLi$, $(C_2F_5SO_2)_2NLi$, $LiClO_4$, $LiAlCl_4$, $LiPF_6$, $LiAsF_6$, $LiSbF_6$, $LiCl$, $LiBr$, $LiI$, and $LiC_4F_9SO_3$. These lithium salts may be used individually or as a combination of two or more thereof.

The shape of the nonaqueous secondary battery assembled from the above discussed members may be, but not limited to, a cylinder, a prism, and a coin.

A ratio of the area of the diffraction peak assigned to the plane (003) to the area of the diffraction peak assigned to the plane (104) of the compound of formula (1) in its initial state may be determined by analyzing the positive electrode active material layer in a battery after use, i.e., after the charge/discharge cycle(s) by XRD. In detail, the inventors' study has revealed that the ratio of the area of the diffraction peak assigned to the plane (003) to the area of the diffraction peak assigned to the plane (104) of the compound of formula (1) in its initial state decreases to about 75% after the charge/discharge cycle(s). Accordingly, the ratio of the area of the diffraction peak assigned to the plane (003) to the area of the diffraction peak assigned to the plane (104) of the compound of formula (1) in its initial state is obtained by calculation making use of the decrease. The area of the diffraction peak assigned to the plane (003) and that of the peak assigned to the plane (104) of the compound of formula (1) in a battery after the charge/discharge(s) are determined as follows: The battery is discharged down to 3.0 V versus an Li counter electrode and then dissembled to take out the positive electrode active material layer, which was subjected to XRD analysis to determine the area of the diffraction peak assigned to the plane (003) and that assigned to the plane (104). In order to precisely calculate the area of the diffraction peak assigned to the plane (003), it is recommended to subtract the baseline of $2\theta=18°$ to $22°$ to remove the influences of an electroconductive material and a binder.

EXAMPLES

The invention will now be illustrated with reference to Examples, but it should be understood that the invention is not limited thereto.

Example 1

Figure 2:
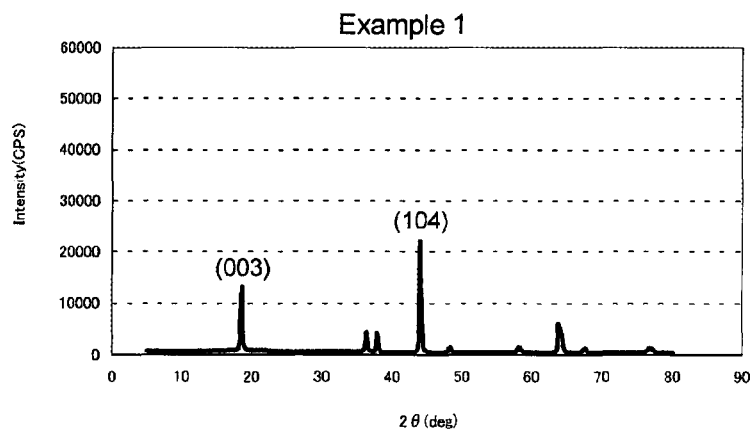
FIG. 2 is an XRD pattern of the compound of formula (1) obtained in Example 1.

A compound represented by $Li_{1.05}Ni_{0.7}Ti_{0.2}(Mn_{2/3}Li_{1/3})_{0.1}O_2$ was prepared as follows. $LiCO_3$, $Ni(OH)_2$, $TiO_2$, and $Mn_3O_4$ were mixed at a molar ratio of Li:Ni:Ti:Mn=1.083:0.7:0.2:0.067 and slurried in a wet pulverizer. The slurry was dried and granulated using a spray drier. The granules were fired at 800° for 20 hours to obtain the desired compound. The rates of temperature rise and drop were 0.5° C./min. An XRD pattern of the compound is shown in FIG. 2.

Example 2

A compound represented by $Li_1Ni_{0.7}Ti_{0.2}(Mn_{2/3}Li_{1/3})_{0.1}O_2$ was prepared in the same manner as in Example 1, except that the source materials were used in a molar ratio of Li:Ni:Ti:Mn=1.033:0.7:0.2:0.067.

Example 3

Figure 3:
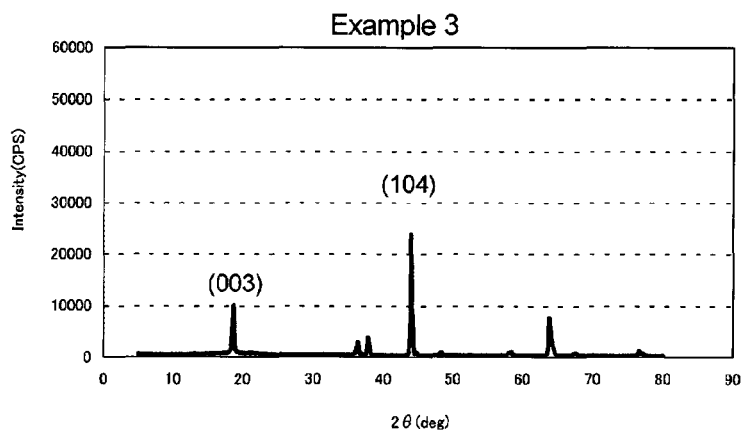
FIG. 3 is an XRD pattern of the compound of formula (1) obtained in Example 3.

A compound represented by $Li_1Ni_{0.65}Ti_{0.25}(Mn_{2/3}Li_{1/3})_{0.1}O_2$ was prepared in the same manner as in Example 1, except that the source materials were used in a molar ratio of Li:Ni:Ti:Mn=1.033:0.65:0.25:0.067. An XRD pattern of the compound is shown in FIG. 3.

Example 4

A compound represented by $Li_1Ni_{0.65}Ti_{0.25}(Mn_{2/3}Li_{1/3})_{0.1}O_2$ was prepared in the same manner as in Example 3, except that the firing was conducted at 900° C. for 20 hours.

Example 5

A compound represented by $Li_1Ni_{0.65}Ti_{0.25}Co_{0.1}O_2$ was prepared as follows. $LiCO_3$, $Ni(OH)_2$, $TiO_2$, and CoOOH were mixed at a molar ratio of Li:Ni:Ti:Co=1:0.65:0.25:0.1 and slurried in a wet pulverizer. The slurry was dried and granulated using a spray drier. The granules were fired at 800° for 20 hours to obtain the desired compound.

Comparative Example 1

A compound according to patent literature 1 was prepared as follows. $Li_2CO_3$, $Ni(OH)_2$, and $TiO_2$ were mixed at a molar ratio of Li:Ni:Ti=1:0.9:0.1 and slurried in a wet pulverizer. The slurry was dried and granulated using a spray drier. The granules were fired at 800° for 20 hours to obtain $LiNi_{0.9}Ti_{0.1}O_2$.

Comparative Example 2

Figure 4:
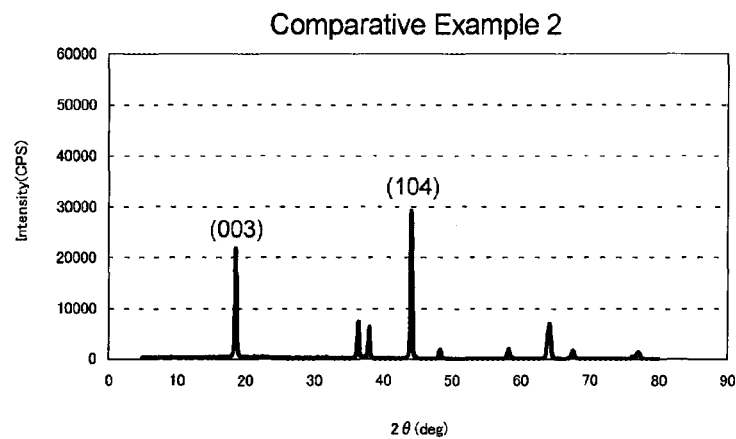
FIG. 4 is an XRD pattern of the compound of formula (1) obtained in Comparative Example 2.

A compound represented by $Li_{0.95}Ni_{0.8}Ti_{0.1}(Mn_{2/3}Li_{1/3})_{0.1}O_2$ was prepared in the same manner as in Example 1, except that the source materials were used in a molar ratio of Li:Ni:Ti:Mn=0.983:0.8:0.1:0.067. An XRD pattern of the compound is shown in FIG. 4.

Comparative Example 3

A compound represented by $LiNi_{0.55}Ti_{0.35}(Mn_{2/3}Li_{1/3})_{0.1}O_2$ was prepared in the same manner as in Example 1, except that the source materials were used in a molar ratio of Li:Ni:Ti:Mn=1.033:0.55:0.35:0.067.

Comparative Example 4

A compound represented by $LiNi_{0.6}Ti_{0.3}(Mn_{2/3}Li_{1/3})_{0.1}O_2$ was prepared in the same manner as in Example 1, except that the source materials were used in a molar ratio of Li:Ni:Ti:Mn=1.033:0.6:0.3:0.067.

Comparative Example 5

A compound represented by $LiNi_{0.75}Ti_{0.15}(Mn_{2/3}Li_{1/3})_{0.1}O_2$ was prepared in the same manner as in Example 1, except that the source materials were used in a molar ratio of Li:Ni:Ti:Mn=1.033:0.75:0.15:0.067.

Evaluation 1

The compounds obtained in Examples and Comparative Examples were analyzed by XRD to determine the ratio of the area of the diffraction peak assigned to the (003) plane to the area of the diffraction peak assigned to the (104) plane. The results obtained are shown in Table 1 below. The XRD conditions were as follows. A sample of powder form was packed into a glass holder in a usual manner. The area of a diffraction peak is the area within ±1.5° of the peak top angle calculated using a unit supplied with the XRD equipment.
XRD equipment: Bragg-Brentano geometry
X ray source: Cuka
Step size: 0.02°
Scan speed: 4°/min.

Evaluation 2

Figure 5:
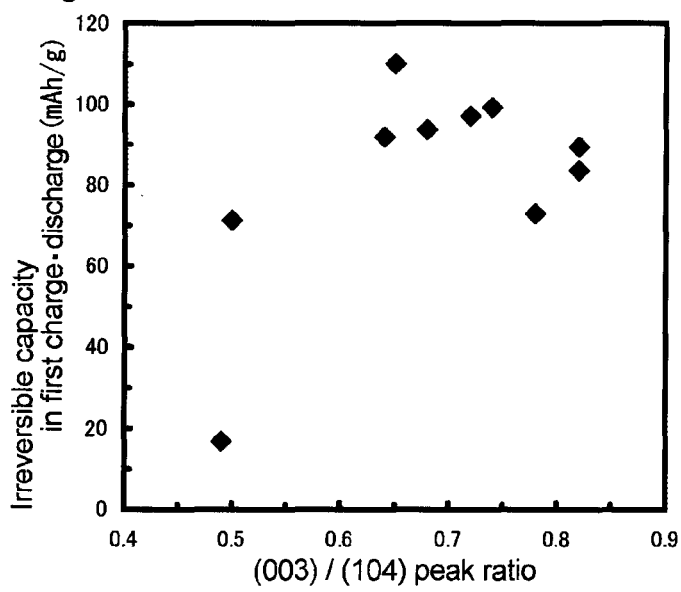
FIG. 5 is a graph showing the relation between the (003)/(104) peak ratio of the compounds obtained in Examples and Comparative Examples and the irreversible capacity in the first charge.

Each of the compounds obtained in Examples and Comparative Examples was assembled into a single-cell battery, and the irreversible capacity in the first charge was determined. Metallic lithium was used as a negative electrode. A positive electrode was made by the method below. Each compound obtained in Examples and Comparative Examples, acetylene black as an electroconductive material, and polyvinylidene fluoride as a binder were suspended in N-methyl-2-pyrrolidone as a solvent to prepare an electrode mixture. The electrode mixture was applied to aluminum foil as a current collector, dried, rolled, and pressed to make a positive electrode. A 1 mol/l $LiPF_6$ solution in a 1:1 by volume mixed solvent of ethylene carbonate and diethyl carbonate having 2% by volume vinylene carbonate externally added thereto was used as an electrolyte. The single cell was charged at a rate of 0.05 C to 4.3 V (vs. Li/Li+) and then discharged at the same rate to 3.0 V (vs. Li/Li+). The irreversible capacity in the charge-discharge was determined. The results obtained are shown in Table 1. The relation between the (003)/(104) peak ratio and the irreversible capacity in the first charge-discharge is graphically shown in FIG. 5.

TABLE 1

| Compound of Formula (1) | (003)/(104) Peak Area Ratio | Irreversible Capacity in 1st Charge-Discharge (mAh/g) |
|---|---|---|
| Example 1 $Li_{1.05}Ni_{0.7}Ti_{0.2}(Mn_{2/3}Li_{1/3})_{0.1}O_2$ | 0.74 | 99.3 |
| Example 2 $Li_1Ni_{0.7}Ti_{0.2}(Mn_{2/3}Li_{1/3})_{0.1}O_2$ | 0.72 | 97.1 |
| Example 3 $Li_1Ni_{0.65}Ti_{0.25}(Mn_{2/3}Li_{1/3})_{0.1}O_2$* | 0.65 | 110.2 |
| Example 4 $Li_1Ni_{0.65}Ti_{0.25}(Mn_{2/3}Li_{1/3})_{0.1}O_2$** | 0.64 | 91.9 |
| Example 5 $Li_1Ni_{0.65}Ti_{0.25}Co_{0.1}O_2$ | 0.68 | 93.7 |
| Comp. Example 1 $Li_1Ni_{0.9}Ti_{0.1}O_2$ | 0.82 | 89.4 |
| Comp. Example 2 $Li_{0.983}Ni_{0.8}Ti_{0.1}(Mn_{2/3}Li_{1/3})_{0.1}O_2$ | 0.82 | 83.6 |
| Comp. Example 3 $Li_1Ni_{0.55}Ti_{0.35}(Mn_{2/3}Li_{1/3})_{0.1}O_2$ | 0.49 | 16.9 |
| Comp. Example 4 $Li_1Ni_{0.6}Ti_{0.3}(Mn_{2/3}Li_{1/3})_{0.1}O_2$ | 0.5 | 71.3 |
| Comp. Example 5 $Li_1Ni_{0.75}Ti_{0.15}(Mn_{2/3}Li_{1/3})_{0.1}O_2$ | 0.78 | 72.9 |

*Firing temperature 800° C.
**Firing temperature 900° C.

As is apparent from the results in Table 1, the compounds obtained in Examples provide high irreversible capacities in the first charge as compared with the compounds of Comparative Examples.

Example 6

(1) Making of Positive Electrode $LiNiO_2$ ($D_{50}$=12 μm) as a positive electrode active material, the compound of Example 3 as an additive, acetylene black as an electroconductive material, and polyvinylidene fluoride as a binder were suspended in N-methyl-2-pyrrolidone as a solvent to prepare an electrode mixture. The electrode mixture was applied to aluminum foil as a current collector, dried, rolled, and pressed to make a positive electrode. The weight ratio of the active material to the additive was 8:2.

(2) Making of Negative Electrode

A 18 μm thick electrolytic copper foil as a current collector was cleaned with an acid cleaning solution at room temperature for 30 seconds and then washed with pure water for 15 seconds. A slurry containing silicon particles was applied to both sides of the current collector to a thickness of 15 μm on each side to form a coating layer. The slurry had a composition of particles:styrene butadiene rubber (binder): acetylene black=100:2.5:2 (by weight). The particles had an average particle size $D_{50}$ of 2 μm as determined using a laser diffraction scattering particle size analyzer Microtrack (Model No. 9320-X100) from Nikkiso Co., Ltd.

The current collector having the coating layers was immersed in a copper pyrophosphate bath having the following composition, and the coating layers were plated with copper by electrolysis under the following electrolysis conditions to form an active material layer on each side. A DSE was used as an anode, and a direct current power source was used. The $P_2O_7$ to Cu weight ratio, $P_2O_7$/Cu, of the copper pyrophosphate bath was 7.
Copper pyrophosphate trihydrate: 105 g/l
Potassium pyrophosphate: 450 g/l
Potassium nitrate: 30 g/l
Bath temperature: 50° C.
Current density: 3 A/dm$^2$
pH: adjusted to 8.2 by the addition of aqueous ammonia and polyphosphoric acid.

The electrolytic plating was stopped at the time when copper was deposited throughout the thickness of the coating layer. There was thus obtained a desired negative electrode. A cross-section of the resulting negative electrode was observed under an SEM to find that the active material particles in the active material layer were covered with a copper layer with an average thickness of 240 nm. The active material layer had a void fraction of 30%.

A lithium secondary battery was assembled using the negative and positive electrodes thus prepared placed to face each other with a 20 μm thick polypropylene porous film as a separator and, as an electrolyte, a 1 mol/l $LiPF_6$ solution in a 1:1 by volume mixed solvent of ethylene carbonate and diethyl carbonate having 2% by volume vinylene carbonate externally added thereto. The amounts of the positive electrode active material and the negative electrode active material were adjusted so that the positive/negative electrode capacity ratio was 1:2 at a charge cut-off potential of 4.3 V.

Comparative Example 6

A lithium secondary battery was made in the same manner as in Example 6, except that only $LiNiO_2$ as a positive electrode active material was used, that is, the additive was not used.

Comparative Examples 7 and 8

A positive electrode was made in the same manner as in Example 6, except for replacing the compound of Example 3 used as an additive with the compound of Comparative Example 1. The weight ratio of the positive electrode active material to the additive was 8:2 in Comparative Example 7 or 7:3 in Comparative Example 8. A lithium secondary battery was made in the same manner as in Example 6.

Example 7

A lithium secondary battery was made in the same manner as in Example 6, except for replacing $LiNiO_2$ as a positive electrode active material with $LiCoO_2$.

Comparative Example 9

A lithium secondary battery was made in the same manner as in Example 7, except that only $LiCoO_2$ as a positive electrode active material was used (the additive was not used).

Comparative Examples 10 and 11

A positive electrode was made in the same manner as in Example 7, except for replacing the compound of Example 3 used as an additive with the compound of Comparative Example 1. The weight ratio of the positive electrode active material to the additive was 8:2 in Comparative Example 9 or 7:3 in Comparative Example 10. A lithium secondary battery was made in the same manner as in Example 7.
Evaluation 3

Figure 6:
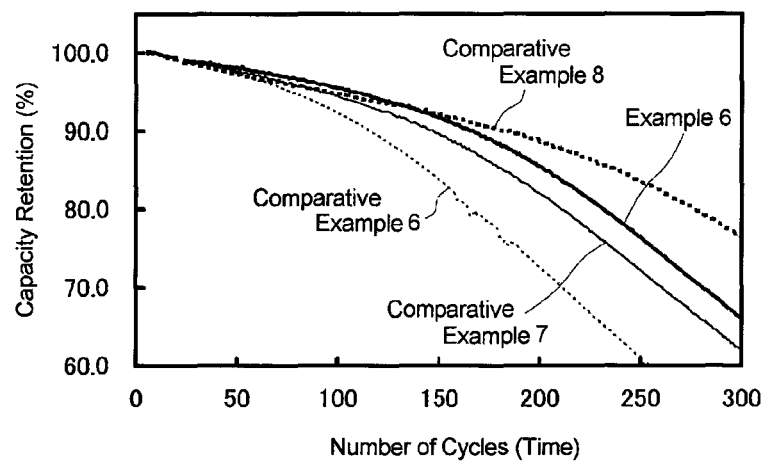
FIG. 6 is a graph showing the relation between the capacity retention and the number of charge/discharge cycles of the secondary batteries obtained in Example 6 and Comparative Examples 6 to 8.
Figure 7:
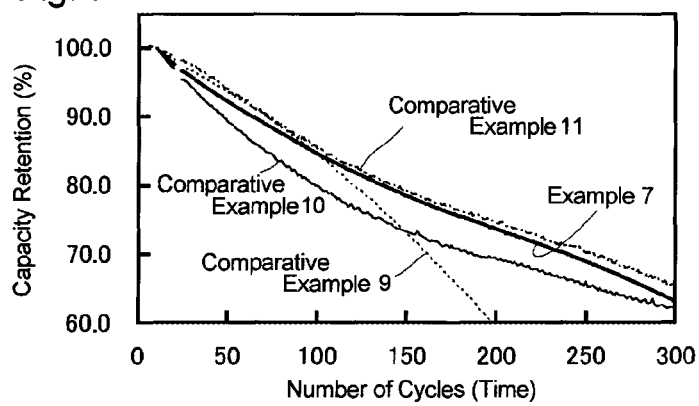
FIG. 7 is a graph showing the relation between the capacity retention and the number of charge/discharge cycles of the secondary batteries obtained in Example 7 and Comparative Examples 9 to 11.

Each of the lithium secondary batteries obtained in Examples and Comparative Examples was charged and discharged 300 cycles (or 250 cycles in Comparative Example 6 or 200 cycles in Comparative Example 9). The capacity after the cycle test was divided by the capacity after the 10th charge/discharge cycle, and the quotient was multiplied by 100 to obtain a capacity retention (%). The results obtained are shown in FIGS. 6 and 7. The charge and discharge cycle test was carried out under the following conditions. The first charge was performed in a constant current/constant voltage mode at a charging rate of 0.05 C to a cut-off potential of 4.2 V (vs. negative electrode). The first discharge was performed in a constant current mode at a discharge rate of 0.05 C to a cut-off potential of 2.7 V (vs. negative electrode). The second charge was in a constant current/constant voltage mode at a charge rate of 0.1 C to the cut-off potential of 4.2 V (vs. negative electrode). The second discharge was at a constant current mode at a discharge rate of 0.1 C to a cut-off potential of 2.7 V (vs. negative electrode). The sixth and subsequent charging operations were in a constant current/constant voltage mode at a charge rate of 0.5 C to a cut-off potential of 4.2 V (vs. negative electrode). The sixth and subsequent discharging operations were in a constant current mode at a discharge rate of 0.5 C to a cut-off potential of 2.7 V (vs. negative electrode).

As is apparent from the results in FIGS. 6 and 7, the batteries of Examples 6 and 7 maintain a high capacity retention after the charge/discharge cycle test as compared with the batteries of Comparative Examples 6 and 9 that any additive was not used. Similar results are observed when comparing the batteries of Examples 6 and 7 with those of Comparative Examples 7 and 10 that the compound described in patent literature 1 was used as an additive. Although the batteries of Comparative Examples 8 and 11 are equal to those of Examples 6 and 7 in capacity retention, they have lower capacities than those of Examples 6 and 7 because of the smaller proportion of the positive electrode active material than in Examples 6 and 7 (7/8=0.88 times as much as the proportion in Examples 6 and 7). These results prove that the use of the additive of the invention improves the charge/discharge cycle characteristics of a secondary battery while maintaining a high capacity.

REFERENCE SIGNS LIST

10 Negative electrode for nonaqueous secondary battery
11 Current collector
13 Active material layer
12a Active material particle
13 Metallic material having low capability of lithium compound formation

The invention claimed is:

1. A nonaqueous secondary battery comprising a positive electrode containing an active material layer and an additive comprising a compound represented by formula:

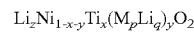
$$Li_zNi_{1-x-y}Ti_x(M_pLi_q)_yO_2$$

wherein x represents a positive number less than 0.3; y represents a positive number less than 0.25; z represents a number from 0.95 to 1.05; M is Fe(III), Al(III), or Mo(VI); p represents a positive number; q represents a number equal to or greater than 0; p and q satisfy the relations: p+q=1 and pv+q=3; and v represents the valence of the metal M, and the compound, when analyzed by XRD, showing diffraction peaks assigned to the planes (003) and the (104), the ratio of the area of the peak of the (003) plane to that of the (104) plane being 0.5 to 0.75.

2. The nonaqueous secondary battery according to claim 1, further comprising a negative electrode having an active material layer containing a negative electrode active material, the negative electrode active material comprising a material containing Si or Sn.

* * * * *